United States Patent
Cobble et al.

(10) Patent No.: US 7,246,832 B2
(45) Date of Patent: Jul. 24, 2007

(54) VEHICLE GRILLE GUARD ASSEMBLY

(75) Inventors: Paul B. Cobble, Oxford, MI (US); Chi-Mou Ni, Washington, MI (US); Eric B. Washington, Southfield, MI (US); Matthew J Noone, Birmingham, MI (US); Michael J. Pevovar, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/057,612

(22) Filed: Feb. 14, 2005

(65) Prior Publication Data

US 2006/0181088 A1 Aug. 17, 2006

(51) Int. Cl.
*B60R 19/52* (2006.01)
(52) U.S. Cl. ..................... 293/115; 293/144
(58) Field of Classification Search ............... 293/115; 296/193.09, 203.02
See application file for complete search history.

(56) References Cited

U.S. PATENT DOCUMENTS

| | | | | |
|---|---|---|---|---|
| 2,229,505 A * | 1/1941 | Jandus | ..................... | 293/144 |
| 2,248,236 A * | 7/1941 | Hollins et al. | .............. | 343/712 |
| 2,580,775 A * | 1/1952 | Helms et al. | ............... | 293/144 |
| 2,620,215 A * | 12/1952 | Luby | ......................... | 293/115 |
| 3,438,667 A * | 4/1969 | Davis | ......................... | 293/115 |
| D235,251 S * | 6/1975 | Asbury | ..................... | D12/169 |
| 4,168,855 A * | 9/1979 | Koch | ......................... | 293/115 |
| 4,671,552 A * | 6/1987 | Anderson et al. | ........... | 293/144 |
| D299,323 S * | 1/1989 | Page | ............................ | D12/14 |
| D300,128 S * | 3/1989 | Brennan | .................... | D12/169 |
| D300,420 S * | 3/1989 | Trinnaman | ................. | D12/171 |
| 4,883,139 A * | 11/1989 | Gross | ....................... | 180/68.6 |
| D307,256 S * | 4/1990 | Holland | ..................... | D12/171 |
| D308,037 S * | 5/1990 | Aiken | ........................ | D12/169 |
| D308,957 S * | 7/1990 | Bennie | ...................... | D12/169 |
| 5,067,760 A * | 11/1991 | Moore et al. | ............... | 293/115 |
| D333,457 S * | 2/1993 | La Foe et al. | ............. | D12/171 |
| 5,215,343 A * | 6/1993 | Fortune | ..................... | 293/115 |
| 5,277,465 A * | 1/1994 | Weir | .......................... | 293/142 |
| 5,403,048 A * | 4/1995 | Ekladyous et al. | ......... | 293/115 |
| D361,316 S * | 8/1995 | Orth et al. | .................. | D12/171 |
| D375,067 S * | 10/1996 | Bronstein | .................. | D12/169 |
| D384,624 S * | 10/1997 | Kincart | ...................... | D12/171 |
| D384,625 S * | 10/1997 | Thorne et al. | ............. | D12/171 |
| 5,683,128 A * | 11/1997 | Heyns | ........................ | 293/115 |
| D395,319 S * | 6/1998 | Kortenhorn et al. | ......... | D15/31 |
| D396,678 S * | 8/1998 | Shklyaver | .................. | D12/171 |
| D404,697 S * | 1/1999 | Siltavuori | .................. | D12/163 |
| D410,879 S * | 6/1999 | Orth, Sr. | .................... | D12/171 |
| 5,919,048 A * | 7/1999 | Slattery | ....................... | 439/34 |
| 6,022,057 A * | 2/2000 | Vermeulen | .................. | 293/132 |
| D422,953 S * | 4/2000 | Waagenaar | ................ | D12/171 |
| D424,992 S * | 5/2000 | Faurote | ..................... | D12/163 |
| D425,462 S * | 5/2000 | Ujiie | ......................... | D12/171 |
| D432,469 S * | 10/2000 | Nelson | ...................... | D12/169 |
| 6,152,504 A * | 11/2000 | Dickson et al. | ............. | 293/115 |
| D440,530 S * | 4/2001 | Geisler | ...................... | D12/171 |
| 6,318,773 B2 * | 11/2001 | Storer | ........................ | 293/115 |

(Continued)

*Primary Examiner*—Kiran B. Patel

(57) ABSTRACT

A grille guard assembly for a vehicle and method of making same includes a hydroformed tubular upper member and a hydroformed tubular lower member. The grille guard assembly also includes at least one inner member interconnecting the upper member and the lower member. The grille guard assembly further includes at least one bracket connected to the lower member for attachment to vehicle structure.

15 Claims, 5 Drawing Sheets

U.S. PATENT DOCUMENTS

| | | | |
|---|---|---|---|
| 6,328,358 B1 * | 12/2001 | Berweiler | 293/115 |
| D455,684 S * | 4/2002 | McGuiness | D12/171 |
| 6,386,624 B1 * | 5/2002 | Schultz et al. | 296/193.1 |
| 6,460,907 B2 * | 10/2002 | Usui | 293/115 |
| D468,241 S * | 1/2003 | Murkett | D12/169 |
| 6,612,595 B1 * | 9/2003 | Storer | 293/117 |
| D483,708 S * | 12/2003 | Roehmer et al. | D12/171 |
| 6,682,111 B1 * | 1/2004 | Houseman et al. | 293/115 |
| 6,685,245 B1 * | 2/2004 | Houseman et al. | 293/115 |
| D495,979 S * | 9/2004 | Metros et al. | D12/163 |
| 6,925,735 B2 * | 8/2005 | Hamm et al. | 293/115 |
| 6,979,016 B1 * | 12/2005 | Wegener | 293/115 |
| 7,044,517 B2 * | 5/2006 | Hyuga | 293/115 |
| 2006/0012898 A1 * | 1/2006 | Helzner | 359/865 |
| 2006/0181088 A1 * | 8/2006 | Cobble et al. | 293/115 |

* cited by examiner

VEHICLE GRILLE GUARD ASSEMBLY

TECHNICAL FIELD

The present invention relates generally to vehicles and, more particularly, to a grille guard assembly for a vehicle and method of making same.

BACKGROUND OF THE INVENTION

It is known to provide a grille guard for a vehicle such as a sport utility vehicle. Typically, the grille guard is made of a number of bent round tubes welded together as a space-frame type of assembly or cage to serve as a protective structure to a front grille of the vehicle.

It is also known to hydroform tubular components or members. Hydroformed tubular members are becoming increasingly popular in automotive vehicle body applications. During vehicle body manufacturing, many of the hydroformed tubular members are used in the vehicle body and chassis of the vehicle.

As a result, it is desirable to provide a new grille guard for a vehicle. It is also desirable to provide a new grille guard for a vehicle that incorporates members formed by a hydroforming process. It is further desirable to provide a method of making a grille guard for a vehicle incorporating hydroformed tubular members. Therefore, there is a need in the art to provide a new grille guard and method of making same that meets these desires.

SUMMARY OF THE INVENTION

It is, therefore, one object of the present invention to provide a new grille guard assembly for a vehicle.

It is another object of the present invention to provide a new method of making a grille guard assembly for a vehicle.

To achieve the foregoing objects, the present invention is a grille guard assembly for a vehicle including a hydroformed tubular upper member and a hydroformed tubular lower member. The grille guard assembly also includes at least one inner member interconnecting the upper member and lower member. The grille guard assembly further includes at least one bracket connected to the lower member for attachment to vehicle structure.

Also, the present invention is a method of making a grille guard assembly for a vehicle. The method includes the step of providing an upper member and a lower member. The method also includes the steps of providing at least one inner member. The method further includes the step of hydroforming the upper member and the lower member. The method includes the step of joining the at least one inner member to the upper member and the lower member. The method includes the step of providing at least one bracket. The method further includes the step of joining the at least one bracket to the lower member for attachment to vehicle structure.

One advantage of the present invention is that a new grille guard assembly is provided for a vehicle that provides increased protection to the grille. Another advantage of the present invention is that a method of making a grille guard assembly is provided that utilizes several forming technologies including tubular hydroforming, roll forming, and embossing to obtain a new grille guard with greater styling features to match unique front-end grille styling. Yet another advantage of the present invention is that the assembly and method allows a vehicle brand logo to be included as part of the grille guard. Still another advantage of the present invention is that the assembly and method uses a hydroforming process to vary sectional profiles to increase styling features of the grille guard to enhance its aesthetics. A further advantage of the present invention is that the assembly and method reduces manufacturing costs.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
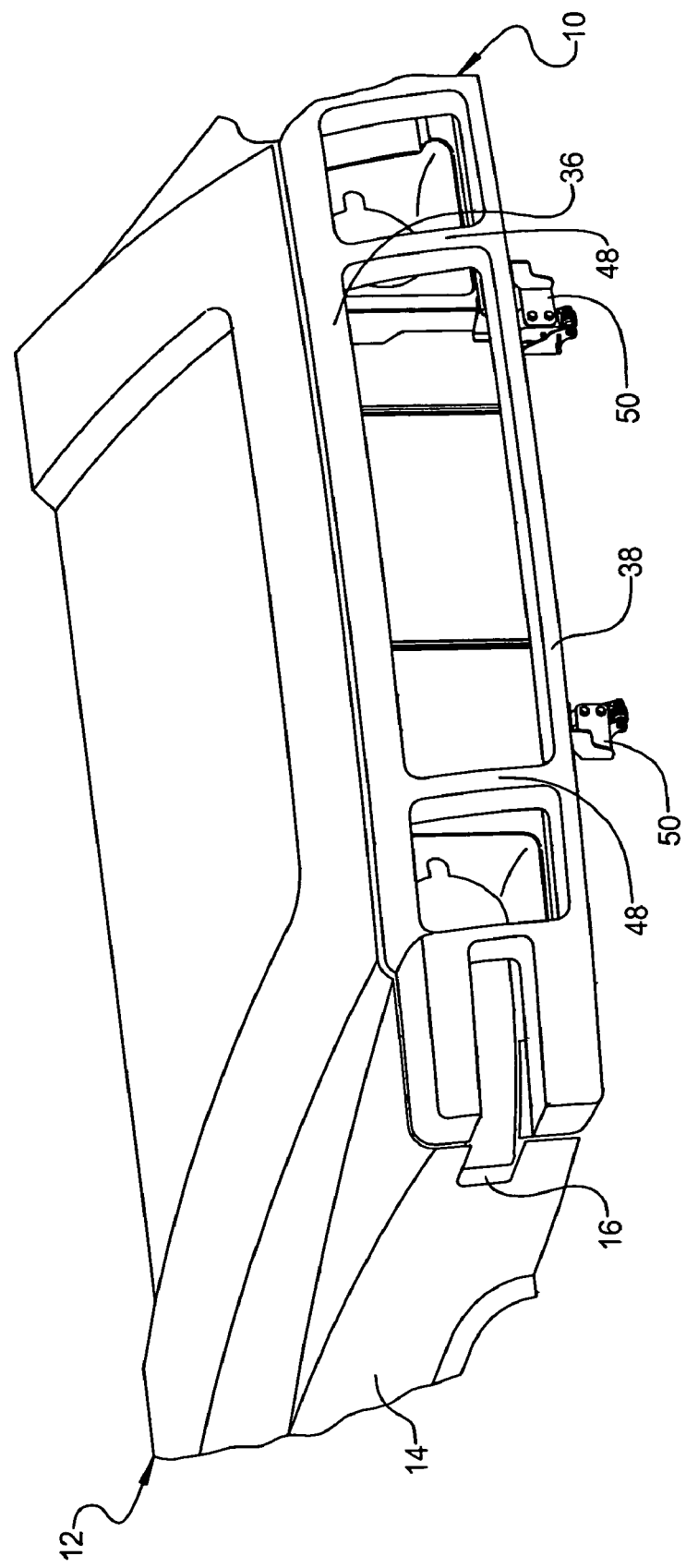
FIG. 1 is a perspective view of a grille guard assembly, according to the present invention, illustrated in operational relationship with a vehicle.
Figure 2:
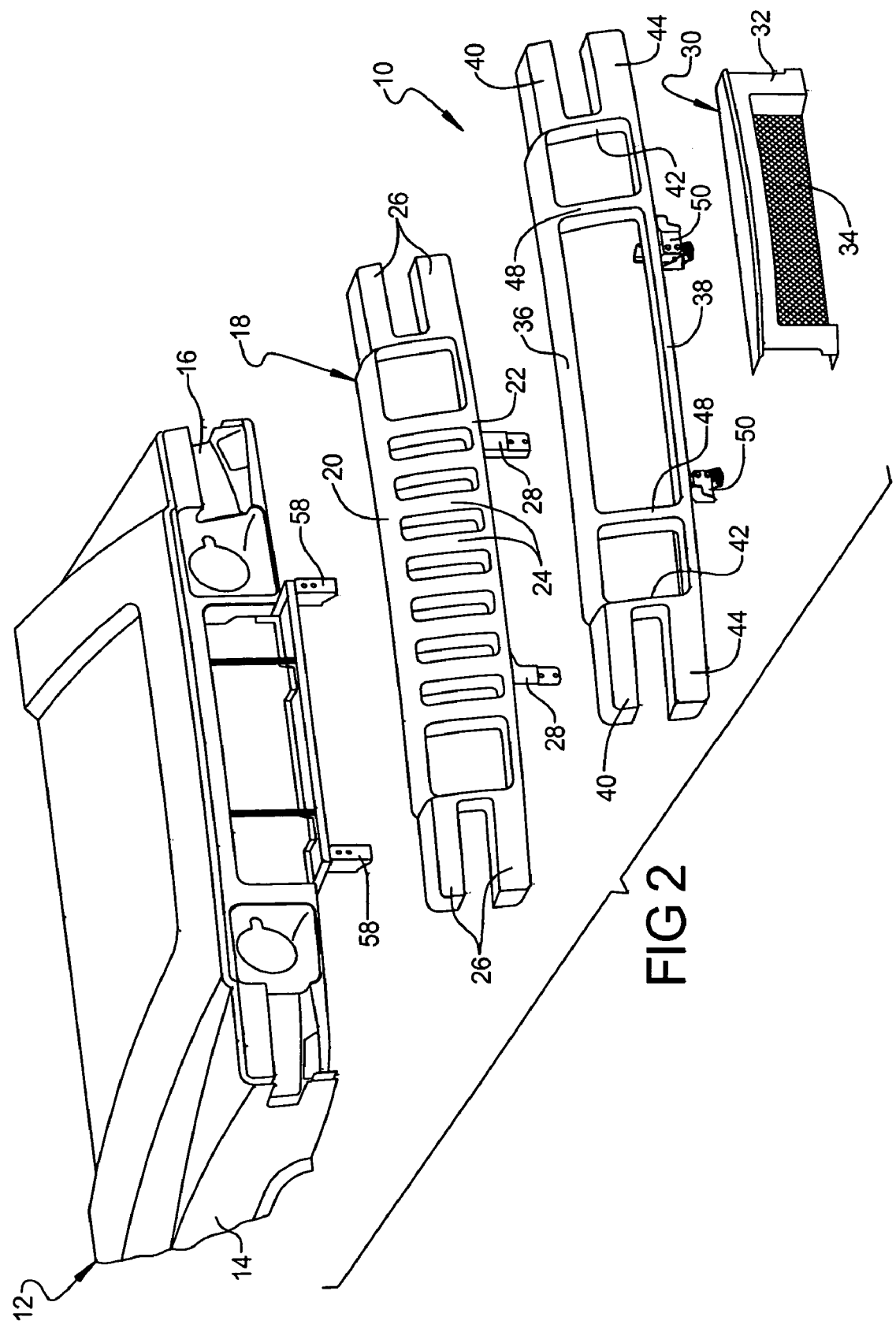
FIG. 2 is an exploded perspective view of the grille guard assembly of FIG. 1.

Referring to the drawings and in particular FIGS. 1 and 2, one embodiment of a grille guard assembly 10, according to the present invention, is shown for a vehicle, generally indicated at 12, such as an automotive vehicle. The vehicle 12 includes a vehicle body 14 having a forward end 16. The vehicle 12 also includes a grille upper, generally indicated at 18, attached to the forward end 16 of the vehicle body 14. The grille upper 18 has an upper member 20 extending laterally and a lower member 22 extending laterally and spaced vertically from the upper member 20. The grille upper 18 also has at least one, preferably a plurality of inner members 24 extending vertically and interconnecting the upper member 20 and the lower member 22. The grille upper 18 further includes at least one, preferably a plurality of outer members 26 extending laterally from the both lateral ends of the upper member 20 and the lower member 22. The grille upper 18 includes at least one, preferably a plurality of brackets 28 extending vertically from the lower member 22. The grille upper 18 is made of a metal material. The grille upper 18 is integral, unitary, and one-piece. It should be appreciated that the grille guard assembly 10 is disposed between the front end 16 of the vehicle 12 and the grille upper 18.

The vehicle 12 includes a lower grille, generally indicated at 30, disposed adjacent the grille upper 18. The lower grille 30 extends laterally and has a generally inverted "U" shape frame 32. The lower grille 30 has a grille 34 disposed between sides of the frame 32. The lower grille 30 covers the hinge mount points and the brackets 28 of the grille upper 18. The lower grille 30 is disposed adjacent the grille upper 18 on a side opposite the grille guard assembly 10.

Figure 3:
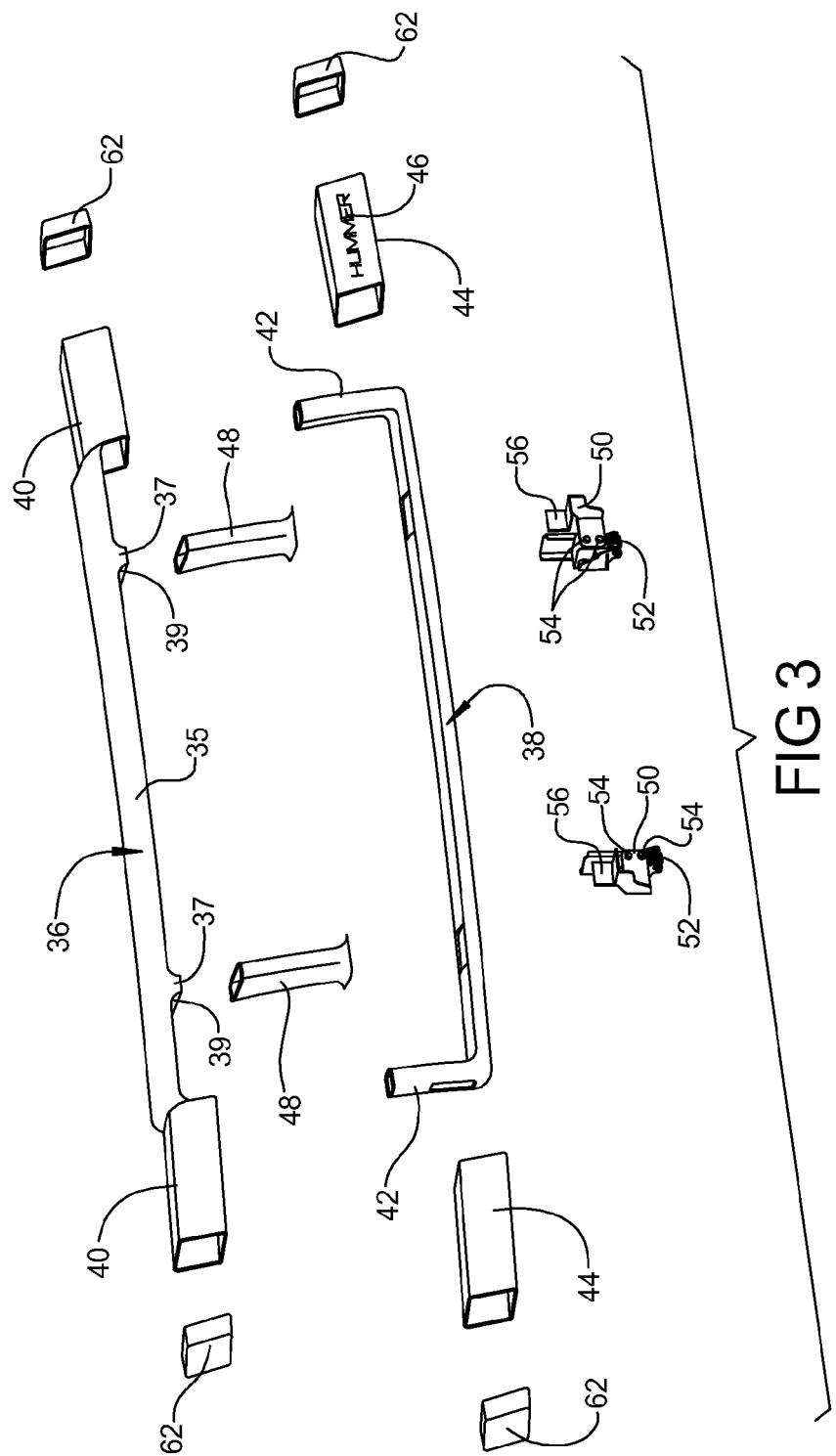
FIG. 3 is an exploded perspective view of a grille guard of the grille guard assembly of FIG. 1.

Referring to FIGS. 2 and 3, the grille guard assembly 10, according to the present invention, includes at least one tubular component or member. In the embodiment illustrated, the grille guard assembly 10 includes a tubular upper member 36 and a tubular lower member 38. The tubular upper and lower members 36 and 38 are made of a metal material. In one embodiment, the tubular upper member 36 has a generally rectangular cross-sectional shape and extends laterally. The sectional profile of the tubular upper member 36 may vary along the length thereof to form outer portions 40 having an enlarged cross-section as compared to the center portion 35 of the upper member. It should be appreciated that the tubular upper member 36 is a monolithic structure being integral, unitary, and one-piece.

In one embodiment, the tubular lower member 38 has a generally rectangular cross-sectional shape. The tubular lower member 38 extends laterally and has end portions 42 extending vertically to form a general "U" shape. The sectional profile of the lower upper member 38 may vary along the length thereof. The tubular upper member 36 and tubular lower member 38 are formed by a hydroforming process to be described. It should be appreciated that the tubular lower member 38 is a monolithic structure being integral, unitary, and one-piece.

The grille guard assembly 10 also includes at least one, preferably a plurality of tubular outer or end members 44. The tubular end members 44 extend laterally and have a generally rectangular cross-sectional shape. At least one of the tubular end members 44 may include indicia 46 such as a vehicle brand logo formed thereon. The tubular end members 44 are made of a metal material. The tubular end members 44 are formed by hydroforming. The tubular end members 44 are connected to the tubular lower member 38 by suitable means such as welding. It should be appreciated that the vehicle brand logo could be hyrdoformed in the tool or through a secondary embossing process.

The grille guard assembly 10 includes at least one, preferably a plurality of inner members 48 extending between the tubular upper member 36 and the tubular lower member 38. The inner members 48 extend vertically and have a generally rectangular cross-sectional shape. The inner members 48 have a constant width cross-section. The inner members 48 are made of a metal material.

The inner members 48 are formed by a roll-forming process. The inner members 48 are joined with the tubular upper member 36 and tubular lower member 38 at the bulged sections 37 of the tubular upper member 36 and tubular lower member 38. It should be appreciated that the desired fillet radius 39 profiles at the joints are accomplished from the hydroforming operation.

Figure 4:
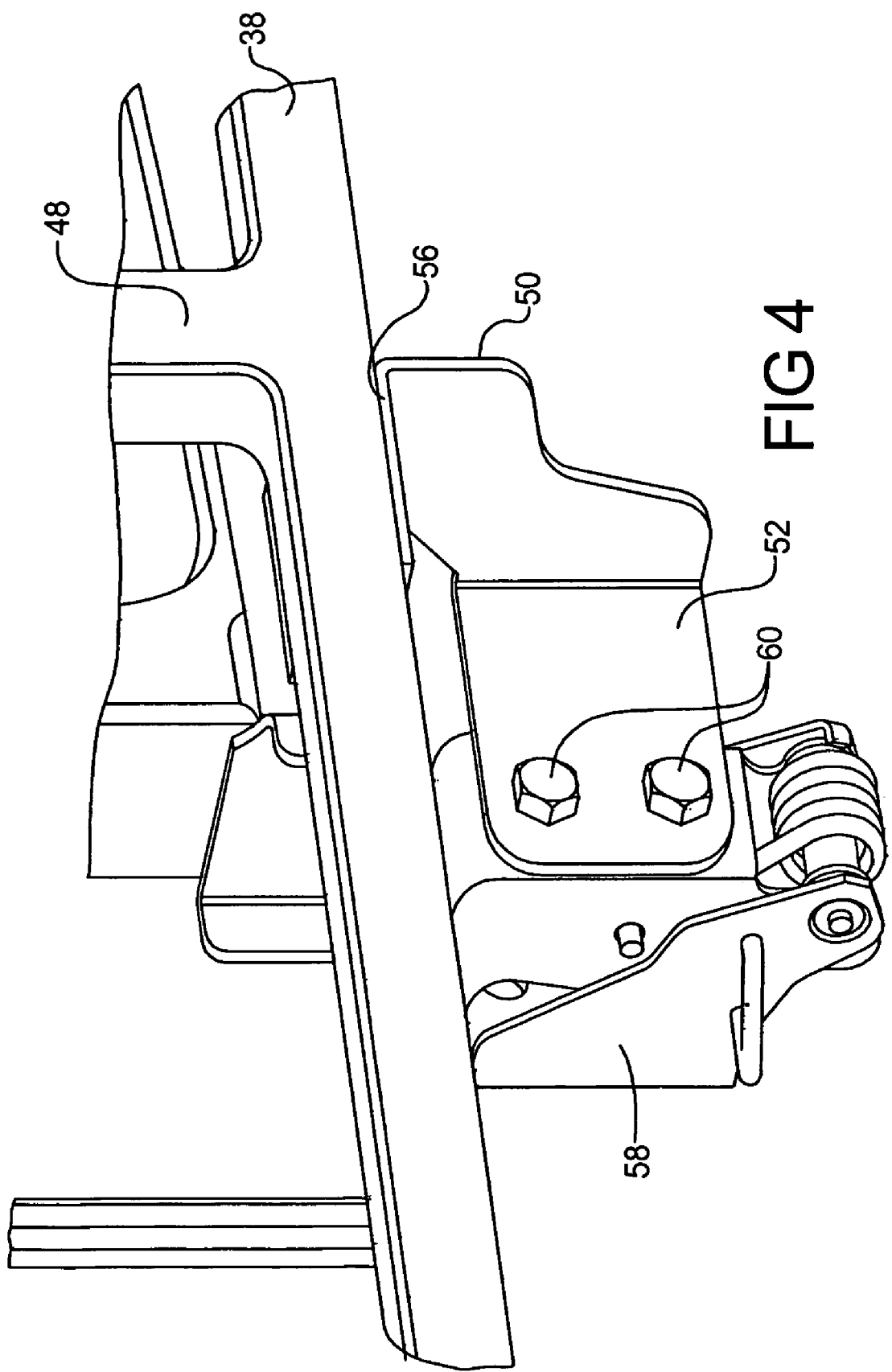
FIG. 4 is a perspective view of a portion of the grille guard assembly of FIG. 1.

Referring to FIGS. 3 and 4, the grille guard assembly 10 includes at least one, preferably a plurality of brackets 50 attached to the tubular lower member 38. The brackets 50 have a lower portion 52 with at least one, preferably a plurality of attachment apertures 54 extending therethrough. The brackets 50 extend vertically and have an upper portion 56 extending laterally and having a generally "L" cross-sectional shape. The brackets 50 are made of a metal material. The brackets 50 are formed by a stamping process. The upper portion 56 of the brackets 50 is joined to the tubular lower member 38 by suitable means such as welding. The lower portion 52 of the brackets 50 is joined to a hood hinge 58 by suitable means such as fasteners 60 extending through the apertures 54 and engaging the hood hinge 58.

Referring to FIG. 3, the grille guard assembly 10 includes at least one, preferably a plurality of end caps 62. The end caps 62 are made of either a plastic or metal material. The end caps 62 are generally rectangular in shape. The end caps 62 are secured to the ends of the outer portions 40 of the tubular upper member 36 and the ends of the end members 44 by suitable means such as a press-fit. It should be appreciated that all the open-ends on both sides of the grille guard assembly 10 are covered with the end caps 62. It should also be appreciated that the complete grille guard assembly 10 is attached to the hood assembly through the brackets 50.

Referring to FIGS. 2 through 4, one embodiment of a method, according to the present invention, of making the grille guard assembly 10 is shown for the vehicle 12. The method includes the step of providing a tubular upper member 36 and a tubular lower member 38. The tubular upper member 36 and tubular lower member 38 are made of a metal material. The method includes the step of hydroforming the tubular upper member 36 and the tubular lower member 38.

The method also includes the step of providing at least one, preferably a plurality of inner members 48. The inner members 48 are made of a metal material. The method includes the step of roll-forming the inner members 48. The method includes the step of joining the inner members 48 to the tubular upper member 36 and the tubular lower member 38 by welding to produce welds therebetween. It should be appreciated that the welds may be formed by MIG welding or Arc brazing.

The method further includes the step of providing at least one, preferably a plurality of end members 44. The end members 44 are made of a metal material. The method includes the step of roll-forming the end members 44. The method may include the step of either hydroforming or embossing indicia 46 such as a vehicle brand logo on at least one of the end members 44. The method includes the step of joining the end members 44 to the tubular lower member 38 by welding to produce welds therebetween. It should be appreciated that the welds may be formed by MIG welding or Arc brazing.

The method includes the step of providing at least one, preferably a plurality of brackets 50. The brackets 50 are made of a metal material. The method includes the step of stamping the brackets 50. The method includes the step of joining the brackets 50 to the tubular lower member 38 by welding to produce welds therebetween. It should be appreciated that the welds may be formed by MIG welding or Arc brazing.

The method includes the step of providing at least one, preferably a plurality of end caps 62. The end caps 62 are made of either a plastic or metal material. The method includes the step of press-fitting the end caps 62 into open ends of the tubular upper member 36 and the end members 44. It should be appreciated that final polishing is required before powder-painting or chrome-plating. It should be appreciated that the complete grille guard assembly 10 is attached to the hood assembly through the brackets 50.

Figure 5:
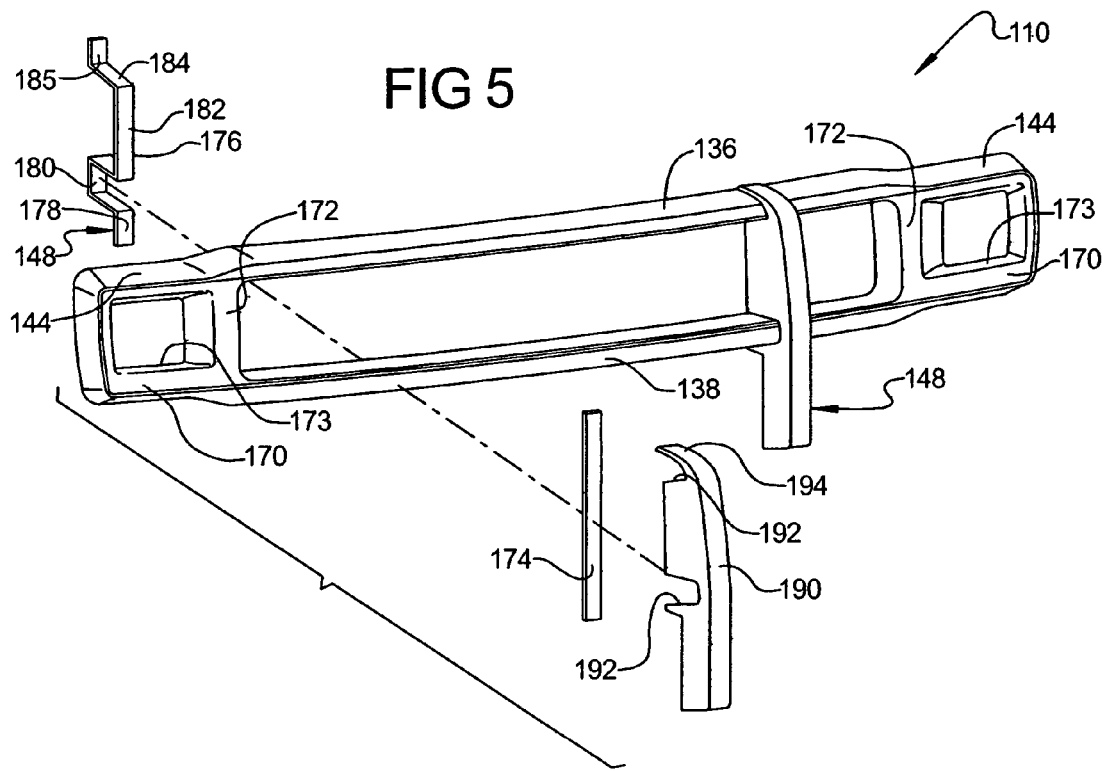
FIG. 5 is an exploded perspective view of another embodiment, according to the present invention, of the grille guard assembly of FIG. 1.
Figure 6:
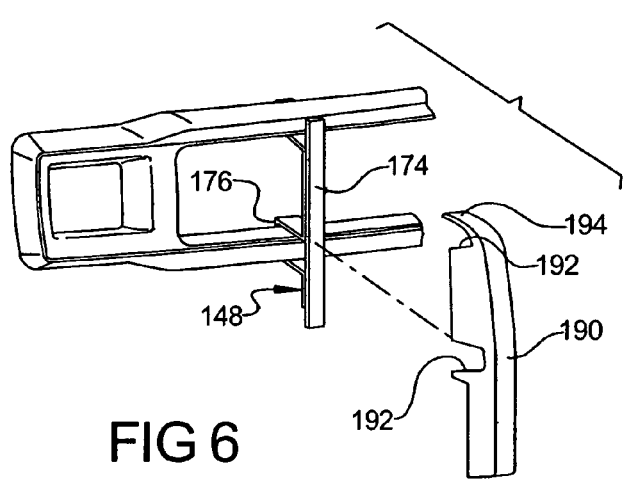
FIG. 6 is a perspective view of a grille guard of the grille guard assembly of FIG. 5 illustrated with a cover removed.

Referring to FIGS. 5 and 6, another embodiment, according to the present invention, of the grille guard assembly 10 is shown. Like parts of the grille guard assembly 10 have like reference numerals increased by one hundred (100). In this embodiment, the grille guard assembly 110 includes a tubular upper member 136 and a tubular lower member 138. The tubular upper member 136 and tubular lower member 138 extend laterally. The tubular upper member 136 and tubular lower member 138 have a generally rectangular cross-sectional shape. The tubular upper member 136 and tubular lower member 138 are formed by either a hydro-forming or roll forming process.

The grille guard assembly 110 also includes at least one, preferably a plurality of tubular end caps or members 144. The tubular end caps 144 are generally "C" shaped and have a generally rectangular cross-sectional shape. The tubular end members 144 are made of a lightweight metal material such as aluminum. The tubular end members 144 are formed by casting. The tubular end members 144 are connected to the tubular upper member 136 and tubular lower member 138 by suitable means such as fasteners or welding.

The grille guard assembly 110 also includes at least one, preferably a plurality of middle inserts 170 disposed within the tubular end members 144. The inserts 170 are generally "C" shaped with an enclosed portion 172 forming an aperture 173 with a generally rectangular shape. The inserts 170 are connected to the tubular end members 144 by suitable means such as fasteners or welding. The inserts 170 are made of a plastic material such as a plastic ionomer. It should be appreciated that the inserts 170 have the same finish, for example chromed, polished, or painted, as the front of the grille guard assembly 110.

The grille guard assembly 110 includes at least one, preferably a plurality of inner members, generally indicated at 148, extending between the tubular upper member 136 and the tubular lower member 138. Each of the inner members 148 includes a first or front member 174 extending vertically and having a generally rectangular shape. Each of the inner members 148 includes a second or back member 176 extending vertically and has a generally rectangular shape. The back member 176 has a length less than the front member 174. The back member 176 has a first end portion 178 extending vertically, a middle portion 180 having a generally "U" shape, and a second end portion 182 extending vertically and having a flange portion 184 extending longitudinally at an angle with a tip portion 185 at an end thereof extending vertically. The front member 174 is disposed over the front surface of the tubular lower member 138 and tubular upper member 136. The back member 176 is disposed over the back of the tubular lower member 138 and the tubular upper member 134 such that the middle portion 180 is disposed over the tubular lower member 138 and the flange portion 184 is disposed under the tubular upper member 136 and the tip portion 185 disposed behind the tubular upper member 136. The front member 174 and back member 176 are attached to each other and to the tubular upper member 136 and tubular lower member 138 by a suitable mechanism such as welding. The front member 174 and back member 176 are made of a metal material. The front member 174 and back member 176 are formed by a stamping process.

The grille guard assembly 110 includes at least one, preferably a plurality of brackets (not shown) such as of a d-ring type attached to the inner members 148. The brackets are attached to the front members 174 by a suitable mechanism such as fasteners (not shown) or welding. It should be appreciated that the brackets are attached to the front bumper by a suitable mechanism such as fasteners (not shown).

The grille guard assembly 110 includes at least one, preferably a plurality of covers 190. The covers 190 are made of a plastic material such as a plastic ionomer. The covers 190 are generally rectangular in shape and have a generally "U" cross-sectional shape. The covers 190 include at least one, preferably a plurality, more preferably a pair of recesses 192 to receive the tubular upper member 136 and tubular lower member 138. The covers 190 include an upper flange 194 extending longitudinally to be disposed over the upper surface of the tubular upper member 136. The covers 190 are disposed over the inner members 148 and are secured to inner members 148 by a suitable mechanism such as fasteners (not shown) or a press-fit. It should be appreciated that the covers 190 cover the front member 174, back member 176, and the connection between the brackets, tubular upper member 136, tubular lower member 138, and the brackets. It should also be appreciated that the covers 190 have the same finish, for example chromed, polished, or painted, as the front of the grille guard assembly 110. It should further be appreciated that the complete grille guard assembly 110 is attached to the front bumper through the brackets.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A grille guard assembly for a vehicle comprising:
a hydroformed tubular upper member having a center portion, a bulged section extending down from the center portion and having a fillet radius, and outer portions having a larger cross-section than the center portion;
a hydroformed tubular lower member;
at least one inner member interconnecting said upper member and said lower member; and
at least one bracket connected to said lower member for attachment to vehicle structure.

2. The grille guard assembly as set forth in claim 1 wherein said upper member extends laterally and has a cross-section that varies in size.

3. The grille guard assembly as set forth in claim 1 wherein said upper member is a monolithic structure being integral, unitary, and one-piece.

4. The grille guard assembly as set forth in claim 1 wherein said upper member has a generally rectangular cross-sectional shape.

5. The grille guard assembly as set forth in claim 1 wherein said lower member extends laterally and has end portions extending vertically to form a general "U" shape.

6. The grille guard assembly as set forth in claim 1 wherein said lower member has a generally rectangular cross-sectional shape.

7. The grille guard assembly as set forth in claim 1 wherein said lower member is a monolithic structure being integral, unitary, and one-piece.

8. The grille guard assembly as set forth in claim 1 including at least one end member connected to one end of said lower member.

9. The grille guard assembly as set forth in claim 8 wherein said at least one end member has a generally rectangular cross-sectional shape.

10. The grille guard assembly as set forth in claim 8 wherein said at least one end member has indicia formed therein.

11. The grille guard assembly as set forth in claim 1 including at least one end cap press fit into the outer portion (40) of said upper member.

12. The grille guard assembly as set forth in claim 9 including at least one end cap press fit into one end of said end member (44).

13. The grille guard assembly as set forth in claim 1 wherein said at least one bracket has a lower end with at least one aperture extending therethrough and an upper end connected to said lower member.

14. The grille guard assembly as set forth in claim 1 wherein said at least one bracket comprises a stamping.

15. The grille guard assembly as set forth in claim 1 wherein said at least one inner member comprises a roll-formed member.

* * * * *